March 30, 1965     E. W. PELTO     3,175,736
CONTAINER FOR DISPENSING A MEASURED QUANTITY
Filed April 9, 1962
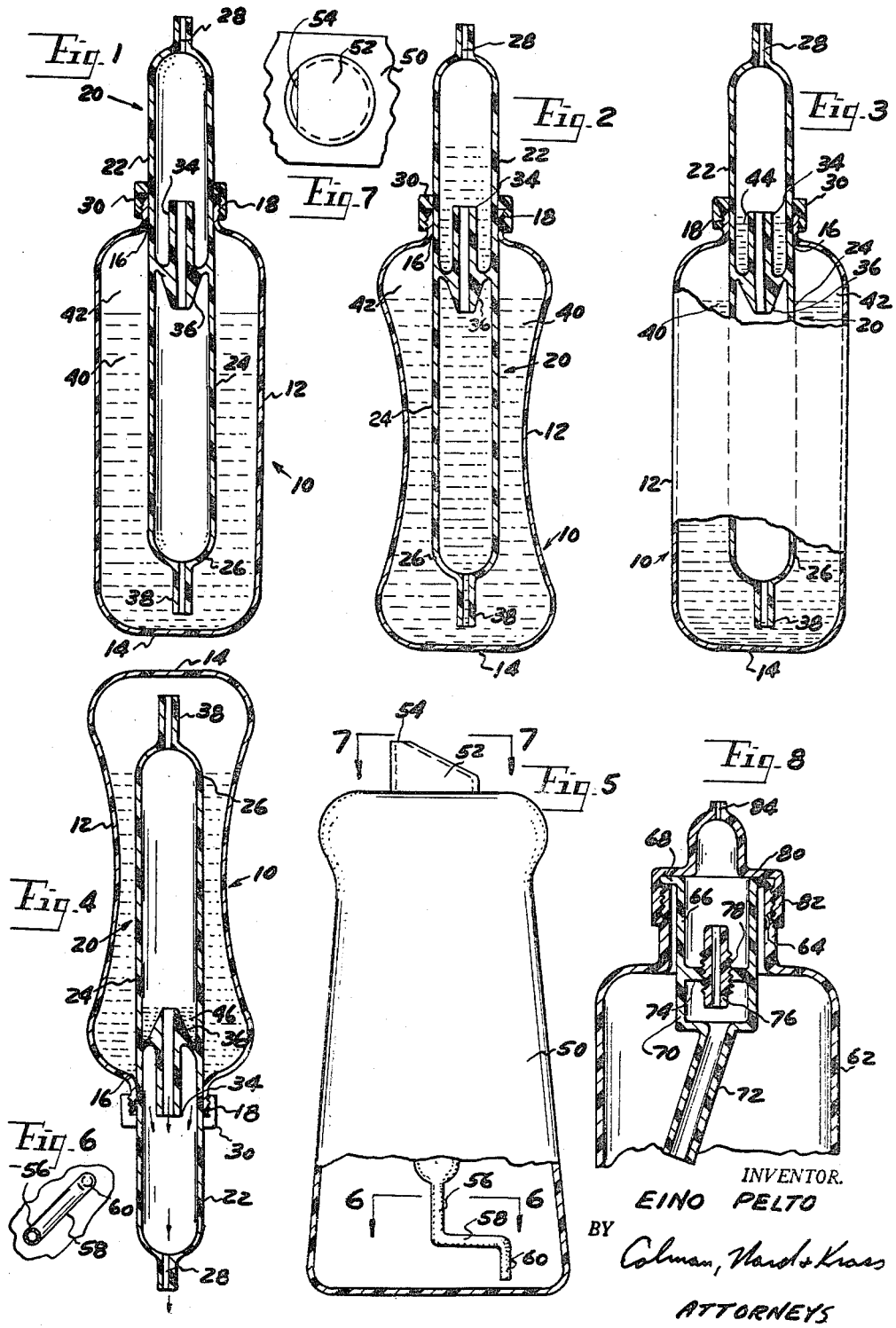
INVENTOR.
EINO PELTO

United States Patent Office 3,175,736
Patented Mar. 30, 1965

3,175,736
CONTAINER FOR DISPENSING A MEASURED QUANTITY
Eino W. Pelto, Hubbell, Mich., assignor of one-half to Dennis J. Kovan, Detroit, Mich.
Filed Apr. 9, 1962, Ser. No. 186,053
13 Claims. (Cl. 222—207)

This invention relates to a container having means for dispensing a measured quantity of a liquid.

The utility of a liquid container which can dispense a predetermined quantity is well recognized. Containers of this type find application in such diverse activities as bar tending and making precision laboratory tests. Many containers and attachments for containers have heretofore been provided for this purpose. To the knowledge of the applicant, all of these devices have employed valves of one sort or another which required moving parts.

It is a primary object of the present invention to provide a liquid container capable of dispensing a measured quantity which does not employ valves or moving parts of any nature.

The provision of a valveless dispenser overcomes the following problems which are inherent in a dispenser which employs valves. First, there is no possibility of malfunction so as to prevent the dispensing of the desired quantity because of improper operation of the valve mechanism. This objection to the use of valve dispensers is particularly important when a viscous or tacky liquid, or one which may produce a precipitate, is dispensed. The formation of residue or thickened solutions in the valve mechanism commonly prevents its proper operation when these liquids are to be dispensed. Another objection to the use of a valve mechanism is its inherent expense. A dependable valve mechanism necessitates a degree of complexity which raises the expense of such devices over a simple non-valved device.

It is therefore seen to be an object of the invention to provide a valveless measured dispensing mechanism which enjoys advantages of reliability, simplicity, and low cost over prior art devices for accomplishing the same purpose.

A preferred embodiment of the present invention, which will subsequently be described in detail, utilizes a container which is formed of plastic and has compressible walls. Such containers are normally formed by blow molding techniques and are termed "squeeze bottles." They are in common use to dispense unmeasured quantities of liquid by compressing their walls so as to pressurize the contents.

A central chamber which may be attached to or removed from the container by a threaded cap section is disposed with respect to the container so as to seal the mouth of the container and to have a first portion extending into the container and a second portion extending externally of the container. That portion of the chamber which extends externally of the container is transparent so that its contents may be observed. A dispensing opening is formed in this external portion of the chamber.

A standpipe is disposed centrally within the portion of the chamber in the container and has its base connected to the walls of the container. The lower end of the standpipe communicates with the interior of the chamber. The container is preferably filled to a level slightly less than its full capacity. In order to dispense a measured amount of liquid, the walls of the container are first compressed while the container is in an upright position so as to cause the liquid to flow up through the standpipe from the lower chamber until the liquid level is observed in the section of the chamber external of the container. The pressure is then removed from the walls allowing the liquid to run back into the container through the standpipe. A measured portion of the liquid is captured in the volume of the chamber surrounding the standpipe. The container is then inverted so that the lower end of the standpipe does not contact the liquid surface within the container. By again compressing the container that quantity of liquid which was captured in the standpipe volume may be dispensed.

In the preferred embodiment, additional means are also provided to prevent the liquid in the container from entering the lower end of the standpipe as the container is inverted prior to expelling the measured quantity. This takes the form of a lower tubular chamber formed between the base of the standpipe and the container proper. When the pressure is removed from the walls of the container following the initial compression in an upright position, this lower chamber becomes evacuated of liquid. After the pressure is equalized within the container only a slight amount of the liquid can re-enter the aperture in this lower chamber because of the vacuum formed by air in the upper sections of the container. As the container is inverted to expel the liquid volume captured in the standpipe area, the small quantity of liquid which is passed into the lower chamber is trapped from moving through the standpipe by the concavity formed about the base of the standpipe. Therefore, only that volume captured by the standpipe is expelled by the container.

It is therefore seen to be an object of the present invention to provide a compressible container for dispensing a measured quantity of a liquid which includes a chamber extending through the mouth of the container having a standpipe disposed within its section in the container so as to capture a measured quantity of liquid when the container is squeezed while the standpipe is in communication with the liquid in the container.

Other objects, advantages, and applications of the present invention will be made apparent from the following detailed description of a preferred embodiment thereof. The description makes reference to the accompanying drawings in which:

FIGURES 1, 2, 3 and 4 are all elevation cross-sectional views of a preferred embodiment of the invention disclosing steps necessary to expel a measured quantity of liquid from the container;

FIGURE 5 is an elevation view, partially broken away, showing an alternative embodiment of my invention;

FIGURE 6 is a cross-sectional view of a detail of the embodiment of FIGURE 5 taken along lines 6—6 thereof;

FIGURE 7 is a sectional view of the embodiment of FIGURE 5 taken along lines 7—7 thereof; and FIGURE 8 is a cross-sectional view of a third embodiment of my invention.

Referring to the drawings, a preferred embodiment of the invention, as disclosed in FIGS. 1-4, makes use of a cylindrical container generally indicated at 10, which is preferably formed of polyethylene, and has a cylindrical wall 12 which is hand deformable so that the container may be grasped by hand and squeezed so as to pressurize the contents thereof. The container preferably includes a flat bottom 14 which may be of heavier gauge than the wall 12. The mouth of the container 16 has an externally threaded cap receiving portion 18. While the preferred embodiment of the invention preferably employs such a "squeeze bottle," any variety of container wherein the contents may be pressurized by suitable means may be employed with the invention.

The measured dispensing device which is employed with the present invention comprises an elongated cylindrical chamber, generally indicated at 20. The chamber 20 may be generally viewed as containing an upper section 22 which extends externally of the container 10, and a central section 24 and a lower section 26 both of which extend within the container 10.

The upper section 22 is generally cylindrical in form and has an outer diameter which approximates the inner diameter of the mouth of the container 16. It is formed of a transparent or translucent material, preferably plastic or glass, so that its contents may be viewed. The section 22 terminates at its upper end in a dispensing nozzle 28. An internally threaded cap 30 is fixed about the outside of the section 22 adjacent its lower end and is adapted to be threaded with the cap receiving portion 18 so as to form a fluid-tight seal therewith. The chamber 20 may be removed from the container 10 by unthreading the cap 30 and lifting the lower sections 24 and 26 through the mouth of the container 16. In this manner the container may be filled and cleaned.

The central section 24 in the chamber 20 is cylindrical in form and communicates with the upper section by means of a neck 32. The central section 24 depends from the cap section 30 centrally within the container 10 and is characterized by a standpipe 34 which extends upward through its midsection. The standpipe 34 is tubular in form and its lower walls 36 flare outward and upward to join the wall section of the chamber 20. These lower portions of standpipe 34 act to separate the central chamber 24 from the lower cylindrical chamber 26. The chamber 26 has a narrowed end portion 38 which communicates with the container 10 and which extends within close proximity to the bottom 14 when the cap 30 is secured to the mouth of the container.

In operation, the container 10 is preferably filled with a liquid 40 to a level approximating that disclosed in FIG. 1 wherein a space 42 remains at the top of the vessel as it is disposed in an upright position. The chamber 20 is then inserted and the cap 30 is threaded about the cap receiving portion 18. The container is then prepared for use by inverting so that the dispensing nozzle 28 is downwardly inclined and the lower end 38 of the chamber 20 is raised above the liquid level in the chamber. The walls 12 of the container 10 are then squeezed so as to press them toward one another pressurizing the liquid 40. This causes that part of the liquid which was contained in the chamber 20 to flow out of the nozzle 28. The container is then re-inverted to a normal upright position. A vacuum then forms in the air volume 42 which prevents the liquid from rising up into the lower end of the chamber 20 to any appreciable degree. The container is now in the condition illustrated in FIG. 1. This is a preparatory step which may not be necessary if the initial level of liquid in the container does not exceed some critical point.

In order to dispense a predetermined amount of liquid, the walls 12 of the container 10 are again squeezed so as to press them toward one another as is shown in FIG. 2, which again pressurizes the liquid 40. This causes the liquid to run up the lower section 26, pass through the standpipe 34, and enter the central and upper sections 24 and 22. The pressure on the walls 12 is gradually increased until the liquid becomes visible within the walls of the upper section 22. The pressure is halted short of the point which would cause liquid to run through the nozzle 28.

The pressure is then removed from the walls 12 of the container 10, allowing the liquid to run back through the chamber 20 into the container 10 under the force of the vacuum 42. A predetermined amount of liquid 44 is captured in the volume defined between a horizontal plane running through the top edge of the standpipe 34 and the walls 36 of the standpipe, as disclosed in FIG. 3. This liquid quantity is the amount which will be dispensed by the container. Otherwise, only a small amount of liquid is disposed in the lowermost end 38 of the chamber 20 because of the vacuum 42.

The container 10 is then again inverted so as to raise the lower section 38 of the chamber 20 above the liquid level in the container, as is illustrated in FIG. 4. As the container is again pressurized by squeezing its walls, as illustrated in FIG. 4, the quantity of liquid in the volume 44 is expelled through the nozzle 28. The small amount of liquid which stood in the lower section 38 of the chamber 20 as the container was in an upright position runs down the sides of the lower chamber 26 and is caught in a volume 46 created by the concavity of the lower sides of the walls 36 of the standpipe. To again dispense the predetermined quantity, the container need only be disposed in an upright position, squeezed until the liquid level is visible in the upper chamber 22, re-inverted, and squeezed again.

FIGS. 5–7 illustrate a slight variation on the invention. The container 50 which is disclosed therein is of the type which is purchased filled with a liquid such as a detergent. The dispensing section is permanently fixed within the container.

The upper section of the dispensing chamber takes the form of a truncated cylinder 52 having a dispensing slot 54 on its upper edge. The lower end of the chamber is doubly bent so as to assure the possibility that no liquid will enter the chamber as the container is turned from an upright position to an inverted position. This double bend provides two tubular sections 56 and 60 connected by an intermediate section 58 which is at right angles to both of them.

A third embodiment of the present invention is illustrated in FIG. 8. A plastic "squeeze bottle" 62 has a mouth 64 with external cap receiving screw threads. An upper tubular chamber 66 has an outer diameter which is similar to the inner diameter of the mouth 64 and is retained within the mouth 64 by a flange 68 which extends outwardly from the chamber 66 and rests on the upper edge of the mouth 64. A lower tubular chamber 70 forms a continuation of the upper chamber 66 and communicates with the contents of the container at its lower end by means of an inclined pipe 72.

The upper chamber 66 and the lower chamber 70 are separated by a bulkhead 74 which has a central aperture which receives a standpipe 76. The standpipe 76 is threaded along its midsection as is the central aperture in the bulkhead 74 and the extension of the standpipe 76 into the upper chamber 66 may be adjusted by rotating the standpipe. This varies the volume of liquid retained in the standpipe area when the container is used in the manner previously described.

The chamber 66 is affixed to the container by a cap 80 which has an internal screw thread 82 which mates with the thread 64 so as to capture the flange 68 between them. A dispensing nozzle 84 completes the cap. In the same manner that the volume surrounding the standpipe in the upper chamber 66 captures a measured amount of liquid for dispensing, the volume adjacent the extension of the standpipe into the lower chamber 70 captures any liquid which may remain in the pipe 72 when the container is unpressurized in an upright position. It is preferable that the volume surrounding the extension of the standpipe 76 into the lower chamber 70 be at least equal to the remaining volume of the chamber 70 in the pipe 72 so that any amount of accumulated liquid may be trapped therein.

Having thus described my invention, I claim:
1. A bottle useful for dispensing a measured quantity of a liquid, comprising: a container having hand deformable walls and a mouth forming the sole opening in said container, and being operative to contain said liquid; a chamber having its walls fixed within said mouth so that a portion of said chamber extends externally of said container and a portion of said chamber extends within said container; a first aperture in the portion of said chamber which extends externally of said container and a second aperture in the portion of said chamber which extends within said container, said second aperture being continuously communicative with the liquid in said container; and a standpipe having its base fixed within said chamber and extending in the direction of the mouth of the container, whereby a measured quantity of liquid may be collected in the volume within the chamber surrounding the standpipe by compressing the walls of the container while it is in a first position, wherein the liquid in the container contacts said second chamber aperture, and this quantity may be dispensed through said first chamber aperture by compressing the walls of the container while it is in a second position wherein the liquid in the container does not contact said second chamber aperture.

2. The bottle of claim 1, wherein the portion of the chamber which extends externally of said container is formed of a material having a sufficient transparency to allow the liquid level therein to be observed.

3. The bottle of claim 1, wherein said chamber is removable from said container and is attached thereto by a cap having a threaded portion which is fixed about the outer diameter of said chamber and which mates with a threaded portion of the mouth of said container.

4. The bottle of claim 1, wherein the base of the standpipe which connects to the chamber is so shaped as to form a concave section about the lower end of the standpipe within the section of the chamber below the standpipe, which concave section acts to prevent liquid from entering the standpipe in the direction of the mouth of the container when the container is inverted.

5. A bottle useful for dispensing a measured quantity of a liquid, comprising: a container having hand deformable walls and a mouth forming the sole opening in said container and being operative to contain said liquid; a chamber having its walls fixed within said mouth so as to define an upper section of said chamber which extends externally of said container and central and lower sections which extend within said container; a bulkhead separating said central and lower sections of said chamber; a dispensing nozzle in the upper section of said chamber; an aperture in the lower section of said chamber communicating with the interior of the container; and a standpipe fixed within a central aperture in said bulkhead so as to extend into said central chamber and to provide a liquid connection between said central and lower chambers, whereby a measured quantity of liquid may be collected in the volume within the central section of the chamber surrounding the standpipe by compressing the walls of the container while it is in a first position, wherein the liquid in the container contacts the aperture in the lower chamber, and this quantity may be dispensed through the dispensing nozzle by compressing the walls of the container while it is in a second position wherein the liquid in the container does not contact said second aperture.

6. The bottle of claim 5, wherein the bulkhead contains a section which is concave with respect to the lower chamber between the line of connection between the standpipe and the bulkhead and the line of connection between the bulkhead and the wall, which section acts to accumulate liquid disposed within the lower section of the chamber when the container is inverted so as to prevent such liquid from passing through the standpipe.

7. The bottle of claim 5, wherein said standpipe extends below the bulkhead into the lower section of the chamber as well as above the bulkhead into the central section of the chamber so as to create a standpipe volume for liquid to be dispensed in the central chamber and a trapping volume for retaining liquid in the lower chamber when the container is inverted.

8. The bottle of claim 5, wherein said standing comprises a tube which makes threaded connection with the aperture in the bulkhead so that the length of its extension above the bulkhead may be adjusted so as to vary the quantity of liquid which is trapped in the volume surrounding the standpipe.

9. A measured dispensing attachment for a liquid container having hand deformable walls and a mouth forming the sole opening in said container and being operative to support a quantity of liquid within said walls, comprising: a chamber having an outer diameter of similar configuration to the inner diameter of the mouth of the container, adapted to be depended within the container; a bulkhead separating the chamber into an upper and a lower section; a standpipe extending from the bulkhead into the upper section of the chamber and making liquid connection with the lower section of the chamber; a concave volume about the bulkhead end of the lower section of the chamber adapted to accumulate liquid disposed in said lower section when the container is inverted; and a cap having a dispensing nozzle therein operative to be engaged to the mouth of the container so as to affix the chamber in the container, said cap being formed of a material having a sufficient transparency to allow the liquid level therein to be observed.

10. A bottle useful for dispensing a measured quantity of a liquid, comprising: a container having hand deformable walls and a mouth forming the sole opening in said container and being operative to contain said liquid; a chamber having its walls fixed within said mouth so that a portion of said chamber extends externally of said container and a portion of said chamber extends within said container; a dispensing nozzle in the portion of said chamber which extends externally of said container; and a standpipe having its base fixed within said chamber and extending in the direction of the mouth of the container; and a tube connecting the section of the chamber below the standpipe with the interior of the container, whereby a measured quantity of liquid may be collected in the volume within the chamber surrounding the standpipe by compressing the walls of the container while it is in a first position, wherein the liquid in the container contacts said tube, and this quantity may be dispensed through said first chamber aperture by compressing the walls of the container while it is in a second position wherein the liquid in the container does not contact said tube.

11. The bottle of claim 10, wherein the tube has at least one right angle bend along its length.

12. A bottle useful for dispensing a measured quantity of a liquid, comprising: a container having hand deformable walls and a mouth forming the sole opening in said container and being operative to contain a quantity of liquid; a chamber fixed with respect to said container having a first upper aperture, and a second lower aperture which extends within said container and is continuously communicative with the liquid in said chamber; and a standpipe having its base fixed within said chamber intermediate said first and second apertures, whereby a measured quantity of liquid may be collected in the volume within the chamber surrounding the standpipe by compressing the walls of the container while it is in a first position, wherein the liquid in the container contacts said second chamber aperture, and this quantity may be dispensed through said first chamber aperture by compressing the walls of the container while it is in a second position wherein the liquid in the container does not contact said second chamber aperture.

13. The bottle of claim 12, wherein the base of the standpipe which connects to the chamber is so shaped as to form a concave section about the lower end of the standpipe within the section of the chamber below the standpipe, which concave section acts to prevent liquid from entering the standpipe when the container is inverted.

References Cited in the file of this patent

UNITED STATES PATENTS

| | | |
|---|---|---|
| 2,638,247 | Taylor | May 12, 1953 |
| 2,706,582 | Flamm | Apr. 19, 1955 |
| 2,744,663 | White | May 8, 1956 |

FOREIGN PATENTS

| | | |
|---|---|---|
| 1,011,494 | France | Apr. 2, 1952 |
| 863,537 | Great Britain | Mar. 22, 1961 |
| 579,267 | Italy | July 11, 1958 |